3,634,441
1-(OMEGA-SUBSTITUTED-ALKYL)-
2-METHYLBENZIMIDAZOLES
William John Welstead, Jr., 1004 Diane Lane 23227,
and Grover Cleveland Helsley, 6501 Glyndon Lane
23225, both of Richmond, Va.
No Drawing. Filed Apr. 11, 1969, Ser. No. 815,492
Int. Cl. C07d *31/42*
U.S. Cl. 260—296 B          3 Claims

ABSTRACT OF THE DISCLOSURE 1-(omega-substituted-alkyl) - 2-methtylbenzimidazoles useful as bronchodilators are disclosed. The compounds are prepared from 1-(omega-haloalkyl)-2-methylbenzimidazoles by reacting them with 5- and 6-membered oxygen-containing heterocyclic compounds.

The present invention relates to certain novel heterocyclic organic compounds which may be referred to as 1-substituted benzimidazoles and is more particularly concerned with 1-(omega-substituted-alkyl)-2-methylbenzimidazoles, acid addition salts thereof, therapeutic compositions containing the same as active ingredients, and methods of making and using them.

The compounds of the present invention may be represented by the following general formula:

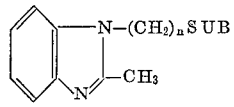

Formula I wherein;
SUB is a heterocyclic radical selected from 4-phenylpiperazinyl, 4-phenylpiperidinyl, 4-phenyl-1,2,3,6-tetrahydropyridinyl, 4-phenyl-4-hydroxyperidinyl, 3-phenyl-3-hydroxypyrrolidinyl, 3-(N-methylanilino)pyrrolidinyl. 3-phenylpyrrolidinyl, and 3-phenyl-3-pyrrolinyl, wherein phenyl is the unsubstituted phenyl radical and the monosubstituted phenyl radical and the monosubstituent is selected from the group consisting of lower alkyl, lower alkoxy, trifluoromethyl and halogen of atomic weight less than eighty, $n$ is a positive integer from 2 to 3 inclusive, and
Non-toxic acid addition salts thereof.

The present invention resides in the radicals present on the heterocyclic substituent of Formula I given above. It has been discovered that when a phenyl radical, a substituted phenyl radical, a N-methylanilino radical, or a phenyl or substituted phenyl radical and a hydroxyl radical connected to the same carbon atom is part of the heterocyclic substituent represented by SUB in Formula I, the novel compounds resulting therefrom have valuable therapeutic activity and are particularly effective in counteracting tissue response to spasmogens such as histamine, acetylcholine and serotonin and are therefore useful as bronchodilators. Thus, when SUB in Formula I is piperazinyl, a phenyl radical attached thereto can be in the 2, 3, or 4 position of the piperazinyl radcial, the 4-phenylpiperazinyl substituent representing a specific and preferred embodiment of the present invention. In another embodiment a phenyl radical and a hydroxyl radical can be attached to the same carbon atom of the heterocyclic substituent, the 4 position being perferred when the six-membered heterocyclic substitutent is piperidinyl and the 3 position being preferred when a five-membered heterocyclic substituent such as pyrrolidinyl is part of Formula I. Similarly, when the substituent is pyrolidinyl, the preferred position is the 3 position when the radical attached thereto is N-methylanilino.

It is, therefore, an object of the present invention to provide novel 1-(omega-substituted-alkyl)-2-methylbenzimidazoles. It is a further object of the invention to provide novel compounds which have an effect on the central nervous system and are useful as bronchodilators. Another object is to provide methods for producing the novel compounds and methods for the utilization thereof. Other objects of this invention will be apparent to one skilled in the art and still other objects will become apparent hereinafter.

The bronchodilator activity of the novel compounds is demonstrable when the compounds are used in the form of the free base or in the form of the non-toxic acid addition salts thereof. The preferred form of the compounds is as their non-toxic acid addition salts for increased water solubility and ease of administration. When the 1-(omega-substituted-alkyl)-2-methylbenzimidazoles represented by Formula I are used and compared with other drugs as bronchodilators using a modified technique of the in vitro preparation of guinea pig tracheal chains (J. D. Castello and E. J. Beer, J. Pharmacol. and Exptl. Therap. 90: 140 (1947), and in particular the compounds of Examples 1 and 4, 1-[2-(4-phenylpiperazinyl)ethyl]-2-methylbenzimidazole and 1-[2-(4-phenyl-1,2,3,6-tetrahydropyridinyl)ethyl]-2-methylbenzimidabole, they demonstrate a relaxing effect against histamine-induced tracheal contractions at a concentration of 2.2 to 3.5 gamma per milliliter of tyrode bath solution and preferably at a concentration of 2.5 gamma per milliliter of bath solution.

When the compound of Example 1 was used and compared with known bronchodilators in determining intratracheal resistance in the unanesthetized pitched guinea pig according to a modified method of H. Konsett and R. Rossler, Arch. Exp. Path. U. Pharm. 195: 71 (1950), it was known to be effective at a dose of 5 mg./kg. intravenously in blocking the bronchial effects of histamine (5 gamma/kg. i.v.), acetylcholine (25 gamma/kg. i.v.) and serotonin (10 gamma/kg. i.v.). The duration of bronchial protection of Example 1 at a dose of 5 mg./kg. i.v. was determined using the method referred to above and was found to be greater than 65 minutes for histamine-induced constriction, approximately 30 minutes for acetylcholine-induced constriction, and one hour for serotonin-induced constriction. The compound of Example 4 at a dose level of 10 mg./kg. intraduodenally in the anesthetized guinea pig provided significant protection against the three spasmogens given above for a duration of about ninety minutes.

Moreover, when the compound of Example 1 was used and compared with known bronchodilators, it was demonstrated to be effective in blocking the lethal effects of horse serum in five out of five sensitized guinea pigs at a dose level of 10 mg./kg. intraduodenally. The protective dose 50's of the compound of Example 1 in sensitized guinea pigs is 10.02 (5.62–17.84) mg./kg. orally and 0.54 (0.47–0.62) mg./kg. intravenously.

In the definition of terms used herein and where they appear elsewhere throughout this specification and in the claims, they have the following significance.

The term "lower alkyl" as used herein includes straight and branched chain radicals of up to eight carbon atoms inclusive and is exemplified by such groups as methyl, ethyl, isopropyl, butyl, isoamyl and the like. The term "lower alkoxy" has the formula —O—lower alkyl. When halogen is referred to herein, preferably a halogen of atomic weight in excess of nineteen but not greater than eighty is employed. Of the halogens, chlorine and fluorine are preferred.

When the term "phenyl" is used, either the unsubstituted phenyl radical or the monosubstituted phenyl radical is implied. The monosubstituted phenyl radical can contain any radical which is not reactive or otherwise interfering under the conditions of reaction such as lower alkyl, lower alkoxy, trifluoromethyl, and halogen of atomic weight less than eighty.

The invention also includes acid addition salts of the above defined bases formed with non-toxic organic and inorganic acids. Such salts are easily prepared by methods known in the art.

When the compounds are to be used as intermediates for preparing other compounds or for any other non-pharmaceutical use, the toxicity or non-toxicity of the salt is immaterial. When the compounds are to be used as pharmaceuticals, they are most conveniently used in the form of pharmaceutically acceptable non-toxic acid addition salts. Both toxic and non-toxic salts are therefore within the purview of the invention. The acids which can be used to prepare the preferred non-toxic acid addition salts are those which produce, when combined with the free bases, salts whose anions are relatively innocuous to the animal organism in therapeutic doses of the salts, so that the beneficial physiological properties inherent in the free bases are not vitiated by side effects ascribable to the anions.

The base is reacted with the calculated amount of organic or inorganic acid in an aqueous miscible solvent such as ethanol or isopropanol with isolation of the salt by concentration and cooling, or the base is reacted with an excess of the acid in an aqueous immiscible solvent, such as ethyl ether or isopropyl ether, with the desired salt separating directly. Exemplary of such organic salts are those prepared with maleic, fumaric, benzoic, ascorbic, pamoic, succinic, methanesulfonic, acetic, propionic, tartaric, citric, lactic, malic, citraconic, itaconic, hexamic, p-aminobenzoic, glutamic, stearic acid and the like. Exemplary of such inorganic salts are those prepared with hydrochloric, hydrobromic, sulfuric, sulfamic, phosphoric and nitric acid.

In general, the novel compounds of this invention are prepared from commercially available 2-methylbenzimidazole. 1 - (omega-hydroxyalkyl)-2-methylbenzimidazoles are prepared by alkylation of 2-methylbenzimidazole with an omega-halo alcohol as, for example, ethylene chlorohydrin or trimethylene bromohydrin. The reaction is generally carried out in a dilute aqueous alkaline medium for a period of from about six hours to about sixteen hours and generally, but not necessarily, at reflux temperature. In an alternate procedure, 2-methylbenzimidazole is dissolved in an inert organic solvent such as dimethylformamide, benzene, toluene, and the like, and the organic solution is added to sodium hydride suspended in the same solvent; the reaction mixture is stirred at ambient temperature for a period of about one hour or until the evolution of hydrogen has ceased. The omega-halo alcohol is added dropwise to the reaction mixture which is refluxed for a period of from about six hours to about ten hours. The cooled reaction mixture is diluted with water and the water insoluble product is extracted using a suitable organic solvent such as chloroform. The crude residue remaining after evaporation of the solvent is purified by crystallization using a suitable organic solvent such as benzene to give the 1-(omega-hydroxyalkyl)-2-methylbenzimidazole intermediate.

1-(omega-haloalkyl)-2-methylbenzimidazoles are prepared by treating 1-(omega-hydroxyalkyl)-2-methylbenzimidazoles dissolved in an inert organic solvent such as chloroform with gaseous hydrogen chloride followed by addition of thionyl chloride. The reaction mixture is refluxed for a period of from about one hour to about three hours, cooled and concentrated to a semi-solid. The residual mass is basified and the organic material is extracted with an organic solvent as, for example, chloroform. The crude material is purified by crystallization from an appropriate solvent such as benzene or a benzene-petroleum ether mixture to give 1-(omega-haloalkyl)-2-methylbenzimidazoles.

The novel 1-(omega-substituted-alkyl)-2-methylbenzimidazoles of the present invention are prepared by combining equimolar amounts of a 1-(omega-halo-alkyl)-2-methylbenzimidazole and a heterocyclic compound in an inert solvent as, for example, 1-butanol, the reaction medium preferably containing a metal carbonate such as sodium or potassium carbonate, and heating the reaction mixture in a steel bomb at a temperature of from about 125° C. to about 155° C. for a period of from about ten hours to about seventy hours. The cooled reaction mixture is concentrated and the crude product is purified by standard laboratory techniques including chromatography, crystallization or conversion to a crystalline acid addition salt. When the metal carbonate is omitted from the reaction mixture, the cooled reaction mixture is concentrated, the residue is basified with dilute caustic and the aqueous basic mixture is extracted with a suitable organic solvent such as chloroform. The combined organic extracts are dried, the solvent is evaporated and the residual material is purified as described hereinabove.

In an alternate procedure the novel compounds are prepared by refluxing a reaction mixture of a 1-(omega-haloalkyl)-2-methylbenzimidazole and a heterocyclic compound in the presence of a metal carbonate in 1-butanol in a nitrogen atmosphere for a period of from about sixty hours to about seventy hours. The product is isolated and purified by the methods given hereinabove.

The following examples are given by way of illustration only and are not to be construed as limiting.

EXAMPLE 1

1 - [2 - (4 - phenylpiperazinyl)ethyl] - 2 - methylbenzimidazole trihydrochloride A mixture of 5 g. (0.026 mole) of 1-(2-chloroethyl)-2-methylbenzimidazole, 4.2 g. (0.026 mole) of 4-phenylpiperazine and 5 g. of sodium carbonate in 30 ml. of n-butanol was refluxed under nitrogen for 70 hours. The reaction mixture was cooled, diluted with benzene and filtered. The filtrate was evaporated in vacuo, the crude oil was dissolved in benzene and chromatographed on a column containing 200 g. of 100–200 mesh magnesium silicate. Elution with 2% methanol-benzene yielded 3.5 g. (42%) of a yellow oil which was converted to the trihydrochloride salt in isopropanol. Following recrystallization from isopropanol the salt melted at 205–208° C.

*Analysis.*—Calculated for $C_{20}H_{26}Cl_3N_4$ (percent): C, 55.88; H, 6.33; N, 13.04. Found (percent): C, 56.32; H, 6.74; N, 13.17.

EXAMPLE 2

1 - [2 - (4 - phenylpiperazinyl)ethyl] - 2 - methylbenzimidazole dimaleate

The free base of Example 1 was converted to the dimaleate salt and crystallized from isopropanol to yield a crystalline salt which melted at 155–157° C.

*Analysis.*—Calculated for $C_{28}H_{32}N_4O_8$ (percent): C, 60.86; H, 5.84; N, 10.14. Found (percent): C, 60.96; H, 6.07; N, 9.93.

EXAMPLE 3

1 - [2 - (4 - hydroxy - 4 - phenylpiperidinyl)ethyl] - 2-methyl-benzimidazole dimaleate A mixture of 15.5 g. (0.08 mole) of 1-(2-chloroethyl)-2-methylbenzimidazole, 13.8 g. (0.08 mole) of 4-phenyl-4-piperidinol, 17 g. of potassium carbonate and 150 ml. of n-butanol was placed in a steel bomb and heated at 150° C. for 24 hours. The mixture was filtered and the filtrate was concentrated to an oil. The crude product was dissolved in chloroform and chromatographed on a column of 60–100 mesh magnesium silicate using chloroform containing increasing amounts of acetone to elute. The purified product was converted to the dimaleate salt which was crystallized from isopropanol, melted at 159–161° C. and weighed 16.5 g. (62%).

Analysis.—Calculated for $C_{29}H_{33}N_3O_9$ (percent): C, 61.36; H, 5.86; N, 7.40. Found (percent): C, 61.69; H, 6.14; N, 7.39.

Utilizing the procedure of Example 3, the following compounds are prepared:

1 - [2 - (3 - hydroxy - 3 - phenylpyrrolidinyl)ethyl]-2-methylbenzimidazole is prepared by reacting 3-phenyl-3-pyrrolidinol and 1-(2-chloroethyl)-2-methylbenzimidazole;

1 - {3 - [4 - hydroxy - 4 - (4 - fluorophenyl)piperidinyl]propyl}-2-methylbenzimidazole is prepared by reacting 4-(4-fluorophenyl)-4-piperidinol and 1-(3-chloropropyl)-2-methylbenzimidazole.

EXAMPLE 4

1 - [2 - (4 - phenyl - 1,2,3,6 - tetrahydropyridinyl)ethyl]-2-methylbenzimidazole A mixture of 6.1 g. (0.03 mole) of 1-(2-chloroethyl)-2-methylbenzimidazole, 5 g. (0.03 mole) of 4-phenyl-1,2,3,6-tetrahydropyridine and 30 ml. of 1-butanol was heated in a steel bomb at 150° C. for three days. The reaction mixture was concentrated to an oil which was treated with 3 N sodium hydroxide. The base-insoluble material was extracted into chloroform, dried over magnesium sulfate and evaporated under reduced pressure to an oil (10 g.). The crude product was dissolved in 50% benzene-acetone and chromatographed on a column containing 300 g. of 60–100 mesh magnesium silicate. The column was eluted with benzene containing increasing amounts of acetone. The dark oil weighed 3.5 g. (37%); a sample was molecularly distilled for analysis.

Analysis.—Calculated for $C_{21}H_{23}N_3$ (percent): C, 79.46; H, 7.30; N, 13.24. Found (percent): C, 79.32; H, 7.39; N, 13.29.

EXAMPLE 5

1 - [2 - (4 - phenylpiperidinyl)ethyl] - 2 - methylbenzimidazole

A mixture of 5 g. (0.026 mole) of 1-(2-chloroethyl)-2-methylbenzimidazole, 4.6 g. (0.029 mole) of 4-phenylpiperidine and 30 ml. of 1-butanol was heated in a steel bomb at 150° C. for 24 hours. The reaction mixture was concentrated, the oily residue treated with 3 N sodium hydroxide and the base-insoluble material was extracted into chloroform. The chloroform extracts were dried over magnesium sulfate and evaporated to an oil (9.1 g.). The crude product was dissolved in benzene and chromatographed on 250 g. of magnesium silicate. At 15% acetone-benzene concentration the pure product was eluted. The oil crystallized on standing and was recrystallized from isooctane yielding 3.9 g. of product (48%) which melted at 109–111° C.

Analysis.—Calculated for $C_{21}H_{24}N_3$ (percent): C, 79.21; H, 7.60; N, 13.20. Found (percent): C, 78.96; H, 7.83; N, 13.06.

Utilizing the procedure of Example 5, the following compounds are prepared:

1 - {3 - [3 - (4 - fluorophenyl)pyrrolidinyl]propyl} - 2-methylbenzimidazole is prepared by reacting 1-(3-chloropropyl)-2-methylbenzimidazole and 3-(4-fluorophenyl)pyrrolidine.

1 - {3 - [4 - (2 - chlorophenyl)piperidinyl]propyl} - 2-methylbenzimidazole is prepared by reacting 1-(3-chloropropyl)-2-methylbenzimidazole and 4-(2-chlorophenyl)piperidine.

1 - {2 - [3 - (2 - bromophenyl) - 3 - pyrrolinyl]ethyl}-2-methylbenzimidazole is prepared by reacting 1-(2-chloroethyl)-2-methylbenzimidazole and 3-(2-bromophenyl)-3-pyrroline.

EXAMPLE 6

1 - {2 - [4 - (2 - fluorophenyl)piperazinyl]ethyl} - 2-methylbenzimidazole dimaleate A mixture of 10 g. (0.05 mole) of 1-(2-chloroethyl)-2-methylbenzimidazole, 9.35 g. of 4-(2-fluorophenyl)piperazine, 15 g. of potassium carbonate and 150 ml. of n-butanol was heated in a steel bomb at 150° C. for 24 hours. The mixture was filtered and the filtrate was concentrated to an oil. The crude product was chromatographed on magnesium silicate and eluted with benzene containing increasing amounts of acetone. The purified oil was converted to the dimaleate salt and recrystallized from isopropanol to give 3 g. (10%) of product which melted at 148–149° C.

Analysis.—Calculated for $C_{28}H_{31}FN_4O_8$ (percent): C, 58.94; H, 5.48; N, 9.82. Found (percent): C, 58.90; H, 5.82; N, 9.45.

EXAMPLE 7

1 - {2 - [4 - (4 - chlorophenyl) - 1,2,3,6 - tetrahydropyridinyl]ethyl}-2-methylbenzimidazole dimaleate A mixture of 8.25 g. (0.04 mole) of 1-(2-chloroethyl)-2-methylbenzimidazole, 8.2 g. (0.04 mole) of 4-(4-chlorophenyl)-1,2,3,6-tetrahydropyridine, 6 g. of potassium carbonate and 50 ml. of n-butanol was heated in a steel bomb at 150° C. for 24 hours. The reaction mixture was filtered and the filtrate was evaporated to an oil. The crude product was chromatographed on a column of magnesium silicate using benzene containing increasing amounts of acetone to elute. The purified product was converted to the dimaleate salt which crystallized from isopropanol, melted at 145–146° C. and weighed 9.5 g. (38%).

Analysis.—Calculated for $C_{29}H_{30}ClN_3O_8$ (percent): C, 59.64; H, 5.18; N, 7.20. Found (percent): C, 59.38; H, 5.19; N, 7.17.

EXAMPLE 8

1-[2-(3-N-methylanilinopyrrolidinyl)ethyl]-2-methylbenzimidazole dimaleate

A mixture of 6.1 g. (0.31 mole) of 1-(2-chloroethyl)-2-methylbenzimidazole, 5.5 g. (0.031 mole) of 3-N-methylanilinopyrrolidine, 4.3 g. of potassium carbonate and 30 ml. of n-butanol was heated in a steel bomb at 150° C. for 72 hours. The reaction mixture was cooled, filtered and the filtrate evaporated to an oil. The crude oil was dissolved in benzene and chromatographed on 300 g. of 60–100 mesh magnesium silicate using benzene with increasing amounts of acetone to elute. The purified base (4 g.) was converted to the maleate salt in isopropanol; the salt melted at 117–124° C. and weighed 4.5 g. (32%).

Analysis.—Calculated for $C_{29}H_{34}N_4O_8$ (percent): C, 61.47; H, 6.05; N, 9.89. Found (percent): C, 61.34; H, 6.02; N, 9.77.

EXAMPLE 9

1-[3-(4-phenylpiperazinyl)propyl]-2-methylbenzimidazole dimaleate

A mixture of 9 g. (0.043 mole) of 1-(3-chloropropyl)-2-methylbenzimidazole and 28 g. (0.4 mole) of 4-phenylpiperazine was heated in a steel bomb at 130° C. four hours. The mixture was poured into water, made basic with 3 N sodium hydroxide and extracted with chloroform. After drying over magnesium sulfate the chloroform extracts were evaporated to an oil. The oil was chromatographed on a 100–200 mesh magnesium silicate column using benzene containing increasing amounts of acetone to elute. The purified base was dissolved in isopropanol and converted to the maleate salt which melted at 179–180° C. and weighed 11.4 g. (47%).

*Analysis.*—Calculated for $C_{29}H_{34}N_4O_8$ (percent): C, 61.47; H, 6.05; N, 9.89. Found (percent): C, 61.46; H, 6.19; N, 9.79.

Utilizing the procedures of Examples 1–9, the following compounds are prepared:

1 - {2-[4-(4-methoxyphenyl)piperazinyl]ethyl}-2-methylbenzimidazole is prepared by reacting 1-(2-chloroethyl)-2-methylbenzimidazole and 4-(4-methoxyphenyl)piperazine;

1 - {3-[3-(2-tolyl)pyrrolidinyl]propyl}-2-methylbenzimidazole is prepared by reacting 1 - (3-chloropropyl)-2-methylbenzimidazole and 3-(2-tolyl)pyrrolidine;

1 - {2-[3-(4-ethoxyphenyl)-3-pyrrolinyl]ethyl}-2-methylbenzimidazole is prepared by reacting 1-(2-chloroethyl)-2 - methylbenzimidazole and 3-(4-ethoxyphenyl)-3-pyrroline;

1 - {3-[4-(3-trifluoromethylphenyl)-1,2,3,6-tetrahydropyridinyl]propyl}-2-methylbenzimidazole is prepared by reacting 1 - (3-chloropropyl)-2-methylbenzimidazole and 4-(3-trifluoromethylphenyl)-1,2,3,6-tetrahydropyridine;

1 - {2 - [4-(3-trifluoromethylphenyl)piperazinyl]ethyl} 2-methylbenzimidazole is prepared by reacting 1-(2-chloroethyl)-2-methylbenzimidazole and 4-(3-trifluoromethylphenyl)piperazine;

1 - {3 - [4-hydroxy-4-(3-trifluoromethylphenyl)piperidinyl]-propyl} - 2 - methylbenzimidazole is prepared by reacting 1-(3 - chloropropyl)-2-methylbenzimidazole and 4-(3-trifluoromethylphenyl)-piperidinol;

1 - {3 - [3-hydroxy-3-(4-tolyl)pyrrolidinyl]propyl}-2-methylbenzimidazole is prepared by reacting 1-(3-chloropropyl)-2-methylbenzimidazole and 3-(4-tolyl)pyrrolidinol.

The present invention also contemplates novel compositions containing the compounds of the invention as active ingredients. In forming the novel compositions of this invention, the active ingredient is incorporated in a suitable carrier, illustratively, a pharmaceutical carrier. Suitable pharmaceutical carriers which are useful in formulating the compositions of this invention include starch, gelatin, glucose, magnesium carbonate, lactose, malt and the like. Liquid compositions are also within the purview of this invention and suitable liquid pharmaceutical carriers include ethyl alcohol, water, saline, propylene glycol, glycerine, glucose syrup and the like. The physical form of the novel compositions depends in part upon the physical characteristics of the active ingredient. When the active ingredient is a solid, the composition is preferably formulated as a capsule or tablet. When the active ingredient is a liquid, the composition is preferably formulated as a soft gelatin capsule. The preferred composition is a tablet containing the active ingredient in the form of its nontoxic acid addition salt.

Although small quantities of the active materials of the present invention are effective when minor therapy is involved or in cases of administration to subjects having a relatively low body weight, unit dosages are usually five milligrams or above and preferably twenty-five, fifty or one hundred milligrams or even higher, depending, of course, upon the emergency of the situation and the particular result desired. Five to fifty milligrams appear to be optimum per unit dose, while usual broader ranges appear to be one to 500 milligrams per unit dose. It is only necessary that the active ingredient constitute an effective amount, i.e., such that a suitable effective dosage will be obtained consistent with the dosage form employed. Obviously, several unit dosage forms may be administened at about the same time.

The following are examples of compositions formed in accordance wtih this invention.

(1) Capsules.—Capsules of 5 mg., 25 mg., and 50 mg. of active ingredient per capsule are prepared. With the higher amounts of active ingredient, reduction may be made in the amount of lactose.

| Typical blend for encapsulation: | Per capsule, mg. |
|---|---|
| Active ingredient, as salt | 5.0 |
| Lactose | 296.7 |
| Starch | 129.0 |
| Magnesium stearate | 4.3 |
| Total | 435.0 |

Additional capsule formulations preferably contain a higher dosage of active ingredient and are as follows:

| Ingredients | 100 mg. per capsule | 250 mg. per capsule | 500 mg per capsule |
|---|---|---|---|
| Active ingredient, as salt | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total | 435.0 | 435.0 | 550.0 |

In each case, uniformly blend the selected active ingredient with lactose, starch, and magnesium stearate and encapsulate the blend.

(2) Tablets.—A typical formulation for a table containing 5.0 mg. of active ingredient per tablet follows. The formulation may be used for other strengths of active ingredient by adjustment of weight of dicalcium phosphate.

| | Per tablet, mg. |
|---|---|
| (1) Active ingredient, as salt | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| Total | 170.1 |

Uniformly blend 1, 2, 4 and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredient and are as follows:

(A) 50 MG. TABLET

| Ingredients: | Per tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, milo starch and the corn starch. This blend is granulated using water as a granulating medium. The wet granules are passed through an eight mesh screen and dried at 140 to 160 degrees Fahrenheit over night. The dried granules are passed through a number ten mesh screen and blended with the proper amount of calcium stearate and this blend is then converted into tablets on a suitable tablet press.

(B) 100 MG. TABLET

| Ingredients: | Per tablet, mg. |
|---|---|
| Active ingredient, as salt | 100.0 |
| Lactose | 190.0 |
| Dicalcium phosphate | 172.2 |
| Starch | 54.0 |
| Milo starch | 21.6 |
| Calcium stearate | 2.2 |
| Total | 540.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit over night. The dried granules are passed through a number ten mesh screen. These dried granules are blended with the proper weight of calcium stearate and the lubricated granules are then converted into tablets on a suitable tablet press.

(3) SYRUP

| Ingredients: | Amts./5 cc. |
|---|---|
| (1) Active ingredient, mg. | 100.0000 |
| (2) Glycerin, ml. | 1.2500 |
| (3) Sorbitol solution 70%, ml. | 2.5000 |
| (4) Sodium saccharin, mg. | 1.0000 |
| (5) Sodium sucaryl, mg. | 10.0000 |
| (6) Methyl p-aminobenzoate, mg. | 5.0000 |
| (7) Propyl p-aminobenzoate, mg. | 0.2500 |
| (8) Curacao flavor, ml. | 0.0025 |
| (9) Water q.s. 5.0000 ml. | |

Procedure:

(1) Dissolve 6 and 7 in hot water.
(2) This solution, when cool, is mixed with No. 3 and the mixture is stirred until uniform.
(3) Dissolve 1, 2, 4, 5 and 8 in this solution and stir until uniform.

(4) INTRAMUSCULAR INJECTION

| Ingredients: | Per ml. |
|---|---|
| (1) Active ingredient | 50.0 mg. |
| (2) Isotonic buffer solution | 4.0 q.s. to 2.0 ml. |

Procedure:

(1) Dissolve the active ingredient in the buffer solution.
(2) Aseptically filter the solution from step No. 1.
(3) The sterile solution is now aseptically filled into sterile ampoules.
(4) The ampoules are sealed under aseptic conditions.

Various modifications and equivalents will be apparent to one skilled in the art and may be made in the compounds, compositions, methods, and procedures of the present invention without departing from the spirit or scope thereof, and it is therefore to be understood that the invention is to be limited only by the scope of the appended claims.

What is claimed:

1. A compound selected from (a) 1-(omega-substituted-alkyl)-2-methylbenzimidazoles, the free base having the formula:

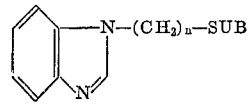

wherein;

SUB is 4-phenyl-1,2,3,6-tetrahydropyridinyl, wherein phenyl is the unsubstituted phenyl radical and the monosubstituted phenyl radical and the monosubstituent is selected from the group consisting of lower alkyl, lower alkoxy, trifluoromethyl and halogen of atomic weight less than eighty, $n$ is a positive integer from 2 to 3 inclusive, and (b) therapeutically acceptable acid addition salts.

2. A compound as defined in claim 1, which is 1-[2-(4-phenyl-1,2,3,6-tetrahydropyridinyl)ethyl]-2 - methylbenzimidazole.

3. A compound as defined in claim 1, which is 1-{2-[4-(4-chlorophenyl)-1,2,3,6 - tetrahydropyridinyl]ethyl} - 2-methylbenzimidazole.

References Cited

UNITED STATES PATENTS 3,535,331  10/1970  Glamkowski _____ 260—302

ALAN L. ROTMAN, Primary Examiner

U.S. Cl. X.R.

260—268 H, 293 D, 293.4 A, 294.7 G, 309, 294.8 R, 295 S; 424—250, 263, 266, 269

UNITED STATES PATENT OFFICE
CERTIFICATE OF CORRECTION

Patent No. 3,634,441            Dated Jan. 11, 1972

Inventor(s) William J. Welstead, Jr. and Grover C. Helsley

It is certified that error appears in the above-identified patent and that said Letters Patent are hereby corrected as shown below:

Column 1, line 13, change "2-methtylbenzimidazoles" to --2-methylbenzimidazoles--; line 17, change "oxygen" to --nitrogen--; line 38, change "-4-hydroxyperidinyl" to ---4-hydroxypiperidinyl--; line 62, change "radcial" to --radical--. Column 2, line 2, change "perferred" to --preferred--; line 6, change "pyrolidinyl" to --pyrrolidinyl--; line 30, change "140" to --104--; line 33, change "methylbenzimidabole" to --methylbenzimidazole--; line 41, change "pitched" to --pithed--; and line 44, change "known" to --shown--. Column 4, line 62, change "$C_{20}H_{26}Cl_3N_4$" to read --$C_{20}H_{27}Cl_3N_4$--. Column 5, line 39, change "trated" to --treated--.

Column 8, line 1, change "administened" to --administered--; line 4, change "wtih" to --with--; line 69, change "meduim" to --medium--. Column 10, lines 15-20, the formula should appear as shown below instead of as in the patent:

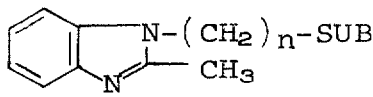

Signed and sealed this 29th day of August 1972.

(SEAL)
Attest:

EDWARD M.FLETCHER,JR.
Attesting Officer

ROBERT GOTTSCHALK
Commissioner of Patents

UNITED STATES PATENT OFFICE
CERTIFICATE OF CORRECTION

Patent No. 3,634,441                    Dated       January 11, 1972

Inventor(s)         William John Welstead, Jr., et al.

It is certified that error appears in the above-identified patent and that said Letters Patent are hereby corrected as shown below:

In the heading to the printed specification, after line 6 insert -- assignors to A. H. Robins Company, Incorporated, Richmond, Va., a corporation of Virginia --.

Signed and sealed this 20th day of February 1973.

(SEAL)
Attest:

EDWARD M. FLETCHER, JR.                 ROBERT GOTTSCHALK
Attesting Officer                       Commissioner of Patents